United States Patent [19]
Moro et al.

[11] Patent Number: 5,772,831
[45] Date of Patent: Jun. 30, 1998

[54] FILTER MEMBRANE ELEMENT AND METHOD OF MANUFACTURING SAME

[75] Inventors: Masashi Moro; Kiyoshi Izumi, both of Osaka, Japan

[73] Assignee: Kubota Corporation, Osaka, Japan

[21] Appl. No.: 676,534

[22] Filed: Jul. 9, 1996

Related U.S. Application Data

[63] Continuation-in-part of Ser. No. 351,353, Apr. 3, 1995, abandoned.

[51] Int. Cl.$^6$ .............................. C09J 5/02; B01D 29/00
[52] U.S. Cl. ................................ 156/309.3; 156/308.6; 264/DIG. 48; 210/228; 210/231; 210/500; 210/488
[58] Field of Search ................................. 210/490, 486, 210/488, 489, 506, 507, 228, 231; 264/48; 156/66, 155, 281, 308.6, 309.3

[56] References Cited

U.S. PATENT DOCUMENTS

| | | | |
|---|---|---|---|
| 3,486,627 | 12/1969 | Ashby et al. | 210/486 |
| 4,197,206 | 4/1980 | Karn | 210/461 |
| 4,302,270 | 11/1981 | Nicolet | 156/290 |
| 4,576,715 | 3/1986 | Michaels et al. | 210/486 |
| 4,804,451 | 2/1989 | Palmer | 204/301 |
| 4,876,007 | 10/1989 | Naruo et al. | 210/486 |
| 5,275,725 | 1/1994 | Ishii et al. | 210/506 |

FOREIGN PATENT DOCUMENTS

| | | |
|---|---|---|
| 713388 | 7/1965 | Canada . |
| 0602560 | 6/1994 | European Pat. Off. . |
| 2462925 | 2/1981 | France . |
| 2478483 | 5/1981 | France . |
| 3726865 | 2/1988 | Germany . |
| 53-125275 | 11/1978 | Japan . |
| 62-033523 | 2/1987 | Japan . |
| 63-72305 | 4/1988 | Japan . |
| 63-126512 | 5/1988 | Japan . |
| 1-94903 | 4/1989 | Japan . |
| 2092914 | 8/1982 | United Kingdom . |
| 2094655 | 9/1982 | United Kingdom . |

*Primary Examiner*—Ana Fortuna
*Attorney, Agent, or Firm*—Barnes, Kisselle, Raisch, Choate, Whittemore & Hulbert P.C.

[57] ABSTRACT

A filter membrane element for a membrane separation unit for use in a water treatment apparatus or the like, and a method of manufacturing the same. An organic filter membrane including a plate-like support member made of non-woven fabric and a film coating formed on both sides of the support member is joined with a surface of a filter plate, whereby the filter membrane element is formed. A portion of the film coating is dissolved to cause the support member to be exposed at that portion. Subsequently, the exposed portion of the support member is joined by adhesion or otherwise with a corresponding portion of the filter plate.

1 Claim, 2 Drawing Sheets

FILTER MEMBRANE ELEMENT AND METHOD OF MANUFACTURING SAME

REFERENCE TO RELATED APPLICATION

This application is a continuation-in-part of application, Ser. No. 08/351,353, filed Apr. 3, 1995 abandoned.

FIELD OF THE INVENTION

This invention relates to a filter membrane element for a membrane separation unit for use in a water treatment apparatus or the like, and to a method of manufacturing such a filter membrane element.

BACKGROUND OF THE INVENTION

A known membrane separation unit used in a water treatment apparatus has a plurality of membrane elements. Each membrane element comprises a rectangular filter plate constructed of ABS resin or the like and organic filter membranes comprised of an ultrafiltration or precision filtration film which are adhesively joined with the front and rear surfaces of the filter plate at peripheral edge thereof. Each organic filter membrane comprises a rectangular plate-like support member made of nonwoven fabric and a film coating formed on both sides of the support member. In reality, therefore, at the joint between the filter plate and the organic filter membrane, the filter plate and the film coating are bonded to each other.

With the foregoing prior art arrangement, however, it is impracticable to obtain any reasonably high bond strength between the support member and the film coating, though the arrangement may provide sufficient bond strength between the filter plate and the film coating. As such, peeling may possibly occur between the support member and the film coating, which eventually means a failure of bond strength between the filter plate and each organic filter membrane.

DISCLOSURE OF THE INVENTION

This invention is directed to overcoming the above-described problem of the prior art and its a primary object of the invention to provide sufficient bond strength between the filter plate and the associated organic filter membranes.

In order to accomplish this objective, the invention presents a method of manufacturing a filter membrane element wherein an organic filter membrane having a plate-like support member made of nonwoven fabric and a film coating formed on both sides of the support member is joined with a surface of a filter plate, the method comprising dissolving a portion of the film coating thereby to cause the support member to be exposed at the dissolved portion thereof, and subsequently joining the exposed portion of the support member with a corresponding portion of the filter plate.

In this way, the nonwoven fabric-made support member can be directly joined with the filter plate, it being thus possible to obtain a bond having sufficient bond strength.

In accordance with the invention, a filter membrane element is provided which comprises a filter plate, an organic filter membrane having a support member made of nonwoven fabric and a film coating formed on a surface of the support member, a felt-like spacer disposed between the filter plate and the organic filter membrane, a portion of the organic filter membrane being adhesively joined with a corresponding portion of the spacer, said portion of the spacer being adhesively joined with a corresponding portion of the filter plate.

According to such arrangement, the adhesive used is allowed to easily penetrate into the felt-like spacer to provide considerable bond strength. That portion of the spacer which constitutes a joint with both the organic filter membrane and the filter plate permits ready infiltration of the adhesive thereto so that the infiltrating adhesive is solidified therein to serve as a water stopper. Therefore, entry through any spacer portion of liquid under treatment can be effectively prevented. Further, the spacer defines a passageway for filtrate that has passed through the organic filter membrane.

DESCRIPTION OF EMBODIMENTS

Figure 1:
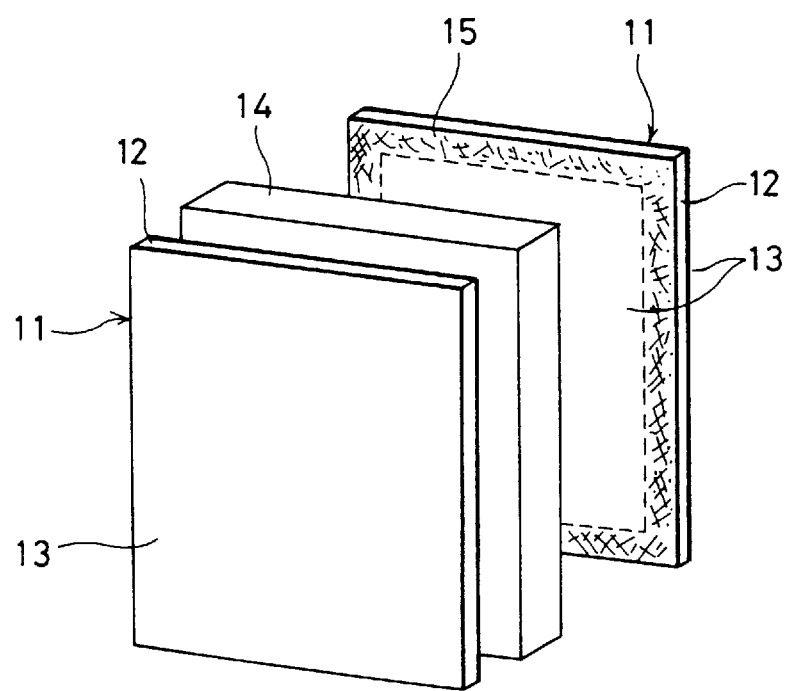
FIG. 1 is a perspective view showing the procedure of filter membrane bonding with respect to a first embodiment of the invention.

In FIG. 1, an organic filter membrane 11, comprised of an ultrafiltration film or precision filtration film, includes a rectangular plate-like support member 12 made of nonwoven fabric and a film coating 13 formed on the front and rear surfaces of the support member 12. At opposite sides of a rectangular filter plate 14 constructed of ABS resin or the like are positioned organic filter membranes 11 which are adhesively attached to the filter plate 14.

For adhesive attachment of organic filter membranes 11 to the filter plate 14, a solvent or a solvent-containing adhesive 15 is applied in a sufficient amount on a portion of the film coating 13 which corresponds to a peripheral edge portion of each organic filter membrane which is selected as a joint site. Thereupon, that portion of the film coating 13 is dissolved by the solvent applied so that the support member 12 is exposed at that portion. The support member 12 and the filter plate 14 are then fixedly joined by the adhesive 15 with each other.

In this way, the film coating 13 of each organic filter membrane 12 is dissolved at the joint site to expose the support member 12 at that site so that the constituent nonwoven fabric of the support member 12 comes into direct bond with the filter plate 14. This provides improved adhesion bond, which ensures sufficient bond strength.

As an alternative to the use of adhesive 15 for joining the support member 12 with the filter plate 14, fusion bond or any other suitable means may be used for purposes of such joining.

Each organic filter membrane 11 need not have a film coating 13 formed on both sides of the support member 12, but instead it may be of such a construction, not shown, that a film coating 13 is formed on an externally exposed portion only of the support member 12 which is opposite to the side facing the filter plate 14. In that case, the film coating need not be dissolved and the peripheral edge portion of the support member on that side thereof which is not formed with a film coating 13 may be joined directly with the filter plate 14.

Figure 2:
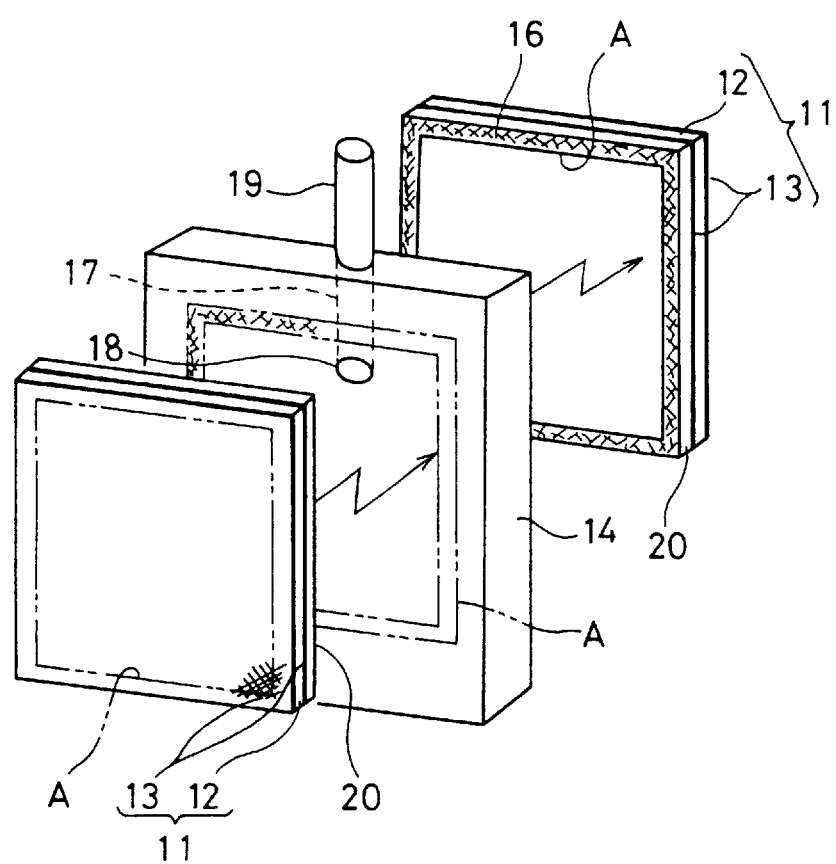
FIG. 2 is a perspective view of a membrane element representing a second embodiment of the invention.

FIG. 2 shows a second embodiment of the invention. In this FIG. 2 embodiment, as in the first embodiment, an organic filter membrane 11, such as an ultrafiltration or precision filtration membrane, comprises a support member 12 made of nonwoven fabric, and a film coating 13 formed on both surfaces of the support member 12. A pair of organic filter membranes 11 are positioned at opposite sides of a filter plate 14 in such a way as to enclose the filter plate 14 between them.

Between each organic filter membrane 11 and the filter plate 14 is interposed a rectangular felt-like spacer 20 of same size as the organic filter membrane 11. It is noted that an organic filter membrane 11 may be provided only on one side of the filter plate 14.

Each organic filter plate 14 and the spacer 20 are joined with each other by an adhesive 16 at respective glued portions A formed along their peripheral edges, and similarly the filter membrane 11 and the spacer 20 are adhesively joined with each other at respective glued portions formed along their peripheral edges, so that the membrane 11, spacer 20, and filter plate 14 are securely fixed together. The filter plate 14 is formed on its surface with an opening 18 for a filtrate flow path 17. The filter plate 14 also has a suction port 19 formed at its top end which communicates with the filtrate flow path 17.

According to such arrangement, a felt-like spacer 20 is interposed between the filter plate 14, which is made of, for example, polyvinyl chloride, a material resistant to adhesive penetration, and each organic filter membrane 11, and the spacer 20 allows adhesive 16 to easily penetrate there into. Therefore, considerable bond strength can be obtained.

During a water treating operation, the membrane element is immersed in the liquid being treated, and the liquid is filtered through the organic filter membranes 11 under negative pressure applied via the suction port 19. Filtrate that has passed through the organic filter membrane 11 is directed to the opening 18 via the spacer 20 which serves as a passage and is guided along the filtrate flow path 17 until it reaches the suction port 19, from which it is delivered to a subsequent system.

Adhesive 16 is allowed to easily infiltrate into the spacer 20 at the peripheral edge portion, i.e., glued portion A of the spacer 20, and the infiltrating adhesive is solidified to serve as a water stopper. This prevents the liquid being treated from entry into the membrane element via the peripheral edge portion of the spacer 20.

As an alternative to using the adhesive 16 in the embodiment of FIG. 2, an adhesive containing a solvent, like the adhesive 15 in the first embodiment, may be employed. The solvent is capable of melting the film coating on the support member 12 of the organic filter membrane 11. The solvent-adhesive is applied to the entire or overall periphery A of the surface of the organic filter membrane and the corresponding confronting peripheral surface of the spacer opposite thereto. Such solvent-adhesive is also applied to the complete or overall periphery of the opposite surface of the spacer and the corresponding confronting peripheral surface of the filter plate. Thus, the peripheral portion only of the film coating on the support member surface confronting the spacer is dissolved by the application of the solvent-adhesive to cause the support member to be exposed at the dissolved portion thereof. The exposed peripheral portion of the support member and the corresponding surface portion of the spacer are adhesively bonded together by the adhesive, and the peripheral surface portion of the other side of the spacer and the corresponding surface portion of the filter plate are adhesively bonded together by the adhesive. The adhesive will permeate into the spacer and become consolidated to seal around the periphery of the spacer.

In accordance with the foregoing, an adhesive functions to bond a filter membrane, a spacer and a filter plate, and the adhesive which has permeated into the spacer is consolidated by itself so that a periphery of the spacer may be sealed.

As a further alternative, and without the use of adhesive, a solvent may be employed which is capable of melting the film coating on the organic filter membrane. The solvent is applied to the entire or overall periphery of the organic filter membrane. Thus, that portion only of the film coating on the support member surface confronting the spacer is dissolved by the application of the solvent to cause the support member to be exposed at the dissolved portion thereof The exposed portion of the support member and the corresponding confronting portion of the spacer, and the peripheral portion of the opposite side of the spacer and the corresponding portion of the filter plate are respectively bonded together by melt welding. A part of the melted resin of the filter plate surface will permeate into the spacer and become consolidated to seal around the periphery of the spacer.

In accordance with the foregoing, a filter membrane and a spacer are bonded by melt welding, and a part of a melt resin on a surface of the filter plate which has permeated into the spacer is consolidated so that a periphery of the spacer may be sealed.

The portion affected by adhering or melt welding covers a constant width overall periphery, so that adhesive strength and sealing ability may be ensured.

What is claimed is:

1. A method of manufacturing a filter membrane element comprising an organic filter membrane having a plate support member made of nonwoven fabric and a film coating formed on both sides of the support member, a filter plate made of resin, and a felt spacer disposed between said filter plate and said organic filter membrane, wherein a solvent which is capable of melting the film coating is applied to an overall periphery of the organic filter membrane;

a portion only of said film coating on a support member surface confronting said spacer is dissolved by the application of said solvent to cause the support member to be exposed at the dissolved portion thereof;

the exposed portion of the support member and the corresponding portion of the spacer, and a portion of the other side of the spacer and the corresponding portion of the filter plate are respectively bonded by melt welding; and a part of a melted resin of the filter plate surface which has permeated into the spacer is consolidated to seal the periphery of the spacer.

* * * * *